United States Patent
Tan et al.

(10) Patent No.: US 10,826,825 B2
(45) Date of Patent: Nov. 3, 2020

(54) ACCESS NETWORK SYSTEM, AND DATA PACKET PROCESSING METHOD AND APPARATUS

(71) Applicant: HUAWEI TECHNOLOGIES CO., LTD., Guangdong (CN)

(72) Inventors: Wei Tan, Shanghai (CN); Chenghui Peng, Munich (DE); Yuhua Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 15/701,734

(22) Filed: Sep. 12, 2017

(65) Prior Publication Data

US 2018/0013668 A1    Jan. 11, 2018

Related U.S. Application Data

(63) Continuation of application No. PCT/CN2015/074226, filed on Mar. 13, 2015.

(51) Int. Cl.
*H04L 12/741*    (2013.01)
*H04L 29/06*    (2006.01)
(Continued)

(52) U.S. Cl.
CPC .......... *H04L 45/54* (2013.01); *H04L 29/06* (2013.01); *H04L 41/0803* (2013.01);
(Continued)

(58) Field of Classification Search
CPC combination set(s) only.
See application file for complete search history.

(56) References Cited

U.S. PATENT DOCUMENTS

2012/0110210 A1    5/2012    Huang et al.
2012/0177053 A1    7/2012    He
(Continued)

FOREIGN PATENT DOCUMENTS

CN    101909042 A    12/2010
CN    102025606 A    4/2011
(Continued)

OTHER PUBLICATIONS

Mackie, S. et al., *Service Function Chains Using Virtual Networking*, Service Function Chaining Internet—Draft, Oct. 17, 2014, pp. 1-44.
(Continued)

*Primary Examiner* — Christopher M Crutchfield
*Assistant Examiner* — Tito Q Pham
(74) *Attorney, Agent, or Firm* — Kilpatrick Townsend & Stockton LLP

(57) ABSTRACT

Embodiments of the present invention provide an access network system, and a data packet processing method and apparatus. The system includes: a controller, configured to perform configuration a flow table for a switching module and a protocol function for at least one functional module; the switching module, configured to send a first data packet to a first functional module of the at least one functional module according to the flow table configured by the controller, where the first functional module is a functional module first indicated in the flow table to process the first data packet; and the at least one functional module, configured to process the first data packet according to the protocol function configured by the controller.

9 Claims, 6 Drawing Sheets

(51) Int. Cl.
*H04L 29/08* (2006.01)
*H04L 12/24* (2006.01)
*H04L 12/927* (2013.01)
*H04L 12/713* (2013.01)
*H04L 12/891* (2013.01)

(52) U.S. Cl.
CPC .......... *H04L 45/745* (2013.01); *H04L 47/803* (2013.01); *H04L 67/10* (2013.01); *H04L 45/586* (2013.01); *H04L 47/41* (2013.01)

(56) References Cited

U.S. PATENT DOCUMENTS

| | | | |
|---|---|---|---|
| 2013/0163427 A1* | 6/2013 | Beliveau | H04L 67/327 370/235 |
| 2013/0201986 A1* | 8/2013 | Sajassi | H04L 45/48 370/390 |
| 2014/0119367 A1* | 5/2014 | Han | H04L 12/4633 370/389 |
| 2014/0280924 A1 | 9/2014 | Hasson et al. | |
| 2014/0310388 A1 | 10/2014 | Djukic et al. | |
| 2015/0195197 A1* | 7/2015 | Yong | H04L 45/74 370/392 |

FOREIGN PATENT DOCUMENTS

| | | |
|---|---|---|
| CN | 102148773 A | 8/2011 |
| CN | 102413141 A | 4/2012 |
| CN | 102546351 A | 7/2012 |
| CN | 104135446 A | 11/2014 |

OTHER PUBLICATIONS

Extended European Search Report, dated Jan. 26, 2018, in European Application No. 15884961.2 (11 pp.).
International Search Report dated Dec. 21, 2015 in corresponding International Patent Application No. PCT/CN2015/074226.
International Search Report dated Dec. 21, 2015 in corresponding International Patent Application PCT/CN2015/074226.

* cited by examiner

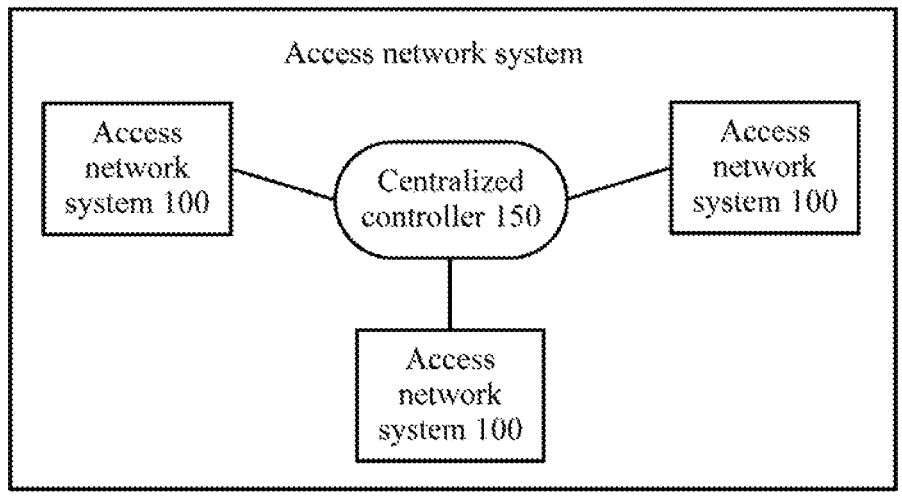

Receive a second data packet — 410

Replace a packet header of the second data packet with a software-defined protocol SDP packet header according to content that is in a configured flow table and that is corresponding to the packet header of the second data packet, to generate a first data packet, where the SDP packet header includes indication information of at least one functional module that processes the first data packet, and a protocol header corresponding to a functional module indicated by the indication information — 420

Send the first data packet to a functional module first indicated by the indication information, so that the first functional module processes a corresponding protocol header in the SDP packet header according to a configured protocol function — 430

FIG. 4

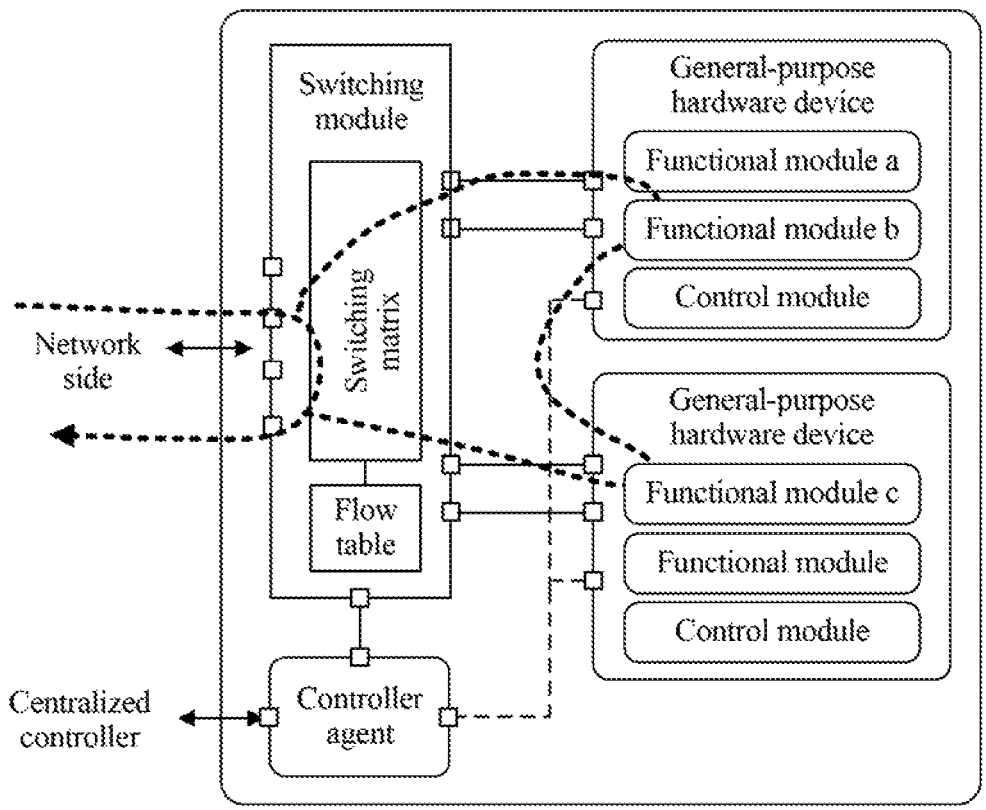
FIG. 6
| a/b/c | Protocol header A | Protocol header B | Protocol header C | Payload |
FIG. 7
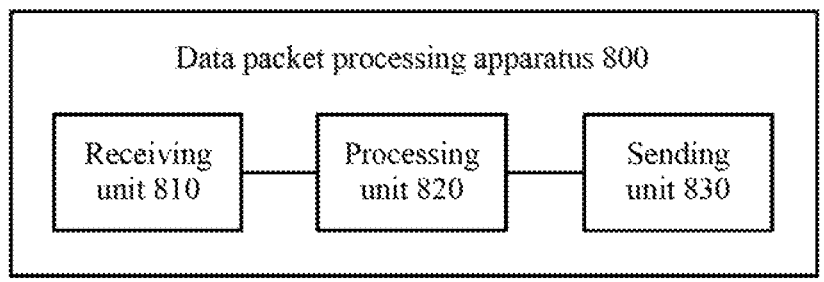
FIG. 8

ACCESS NETWORK SYSTEM, AND DATA PACKET PROCESSING METHOD AND APPARATUS

CROSS-REFERENCE TO RELATED APPLICATIONS

This application is a continuation of International Application No. PCT/CN2015/074226, filed on Mar. 13, 2015, the disclosure of which is hereby incorporated by reference in its entirety.

TECHNICAL FIELD

The present invention relates to the communications field, and in particular, to an access network system, and a data packet processing method and apparatus.

BACKGROUND

In a conventional radio access network, a data packet is processed basically according to a fixed set of procedures, that is, processed by sequence, by format, and layer by layer according to a fixed protocol stack.

Various radio access standard networks are deployed in the future. However, a same set of mechanism is used in an existing radio access network to process all types of data packets. Therefore, service adaptability is poor, processing efficiency is low, and requirements of the future network cannot be met.

SUMMARY

The present invention provides an access network system, and a data packet processing method and apparatus, so that an appropriate procedure can be selected for processing a data packet and processing efficiency is improved.

According to a first aspect, an access network system is provided, where the access network system includes: a controller, configured to perform configuration a flow table for a switching module and a protocol function for at least one functional module; the switching module, configured to send a first data packet to a first functional module of the at least one functional module according to the flow table configured by the controller, where the first functional module is a functional module first indicated in the flow table to process the first data packet; and the at least one functional module, configured to process the first data packet according to the protocol function configured by the controller.

With reference to the first aspect, in a first possible implementation manner, the switching module is specifically configured to: receive a second data packet; replace a packet header of the second data packet with a software-defined protocol SDP packet header according to content that is in the flow table and that is corresponding to the packet header of the second data packet, to generate the first data packet, where the SDP packet header includes indication information of the at least one functional module and a protocol header corresponding to a functional module indicated by the indication information, and send the first data packet to the first functional module; and the first functional module is specifically configured to: process, according to the protocol function configured by the controller, a protocol header that is in the SDP packet header and corresponding to the first functional module.

With reference to the first possible implementation manner, in a second possible implementation manner, the first functional module is further configured to: send the first data packet processed by the first functional module to a second functional module, where the second functional module is a functional module that follows the first functional module and that is indicated by the indication information, and the second functional module is another functional module in the at least one functional module; or send the first data packet processed by the first functional module to the switching module, so that the switching module performs next-hop forwarding.

With reference to the first aspect or the first or the second possible implementation manner, in a third possible implementation manner, the at least one functional module operates in one or more general-purpose hardware devices, and the first functional module operates in a first general-purpose hardware device of the one or more general-purpose hardware devices.

With reference to the first aspect or the first or the second possible implementation manner, in a fourth possible implementation manner, the controller is specifically configured to: configure the flow table for the switching module and the protocol function for the at least one functional module according to a control policy.

With reference to the third possible implementation manner, in a fourth possible implementation manner, the access network system further includes: a centralized controller, configured to generate the control policy, and configure the control policy onto the controller.

With reference to the third or the fourth possible implementation manner, in a fifth possible implementation manner, the control policy includes a data packet processing mode and a data packet processing procedure; and the controller is specifically configured to perform configuration the protocol function for the at least one functional module according to the data packet processing mode, and configure the flow table for the switching module according to the data packet processing mode and the data packet processing procedure.

According to a second aspect, a data packet processing method is provided, where the method includes: receiving a second data packet; replacing a packet header of the second data packet with a software-defined protocol SDP packet header according to content that is in a configured flow table and that is corresponding to the packet header of the second data packet, to generate a first data packet, where the SDP packet header includes indication information of at least one functional module that processes the first data packet, and a protocol header corresponding to a functional module indicated by the indication information; and sending the first data packet to a functional module first indicated by the indication information, so that the first functional module processes a corresponding protocol header in the SDP packet header according to a configured protocol function.

According to a third aspect, a data packet processing method is provided, where the method includes: receiving a first data packet, where a packet header of the first data packet is a software-defined protocol SDP packet header, and the SDP packet header includes indication information of at least one functional module that processes the first data packet, and a protocol header corresponding to a functional module indicated by the indication information; processing a corresponding protocol header in the SDP packet header according to a configured protocol function; and sending the processed first data packet to a next functional module indicated by the indication information; or sending the processed first data packet to a switching module, so that the switching module performs next-hop forwarding.

According to a fourth aspect, a data packet processing apparatus is provided, where the apparatus includes: a receiving unit, configured to receive a second data packet; a processing unit, configured to replace a packet header of the second data packet with a software-defined protocol SDP packet header according to content that is in a configured flow table and that is corresponding to the packet header of the second data packet, to generate a first data packet, where the SDP packet header includes indication information of at least one functional module that processes the first data packet, and a protocol header corresponding to a functional module indicated by the indication information; and a sending unit, configured to send the first data packet to a functional module first indicated by the indication information, so that the first functional module processes a corresponding protocol header in the SDP packet header according to a configured protocol function.

According to a fifth aspect, a data packet processing apparatus is provided, where the apparatus includes: a receiving unit, configured to receive a first data packet, where a packet header of the first data packet is a software-defined protocol SDP packet header, and the SDP packet header includes indication information of at least one functional module that processes the first data packet, and a protocol header corresponding to a functional module indicated by the indication information; a processing unit, configured to process a corresponding protocol header in the SDP packet header according to a configured protocol function; and a sending unit, configured to send the processed first data packet to a next functional module indicated by the indication information; or send the processed first data packet to a switching module, so that the switching module performs next-hop forwarding.

In the foregoing technical solutions of the present invention, a controller is configured to perform configuration a protocol function for a functional module and a flow table for a switching module, the switching module sends a data packet to a corresponding functional module according to the flow table, and then the functional module processes the data packet according to a configured protocol function. In this way, an appropriate procedure can be selected for processing the data packet, processing efficiency is improved, and software definition at a protocol stack layer is implemented.

BRIEF DESCRIPTION OF DRAWINGS

FIG. 3 is a schematic block diagram of an access network system according to an embodiment of the present invention;

FIG. 4 is a schematic flowchart of a data packet processing method according to an embodiment of the present invention;

FIG. 6 is a schematic block diagram of an access network system according to another embodiment of the present invention;

FIG. 7 is a schematic diagram of a format of an SDP data packet according to an embodiment of the present invention;

FIG. 8 is a schematic block diagram of a data packet processing apparatus according to an embodiment of the present invention;

DESCRIPTION OF EMBODIMENTS

The following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the term "and/or" in this embodiment of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
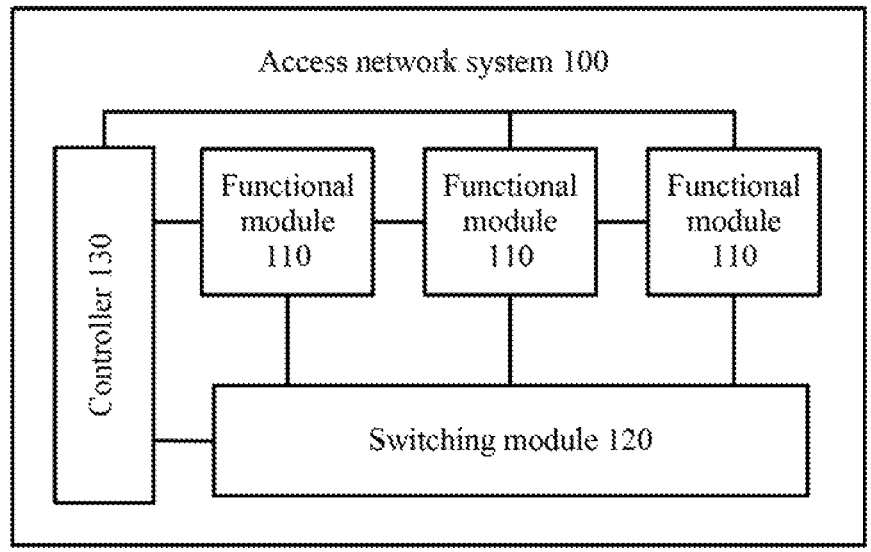
FIG. 1 is a schematic block diagram of an access network system according to an embodiment of the present invention.

FIG. 1 is a schematic block diagram of an access network system 100 according to an embodiment of the present invention. As shown in FIG. 1, the access network system 100 may include: at least one functional module 110, a switching module 120, and a controller 130.

It should be understood that the access network system 100 may include one or more functional modules 110. In FIG. 1, only three functional modules 110 are used as an example, but the present invention is not limited thereto.

The controller 130 is configured to perform configuration a flow table for the switching module 120 and a protocol function for the at least one functional module 110.

Specifically, the controller 130 may configure a network protocol for the at least one functional module 110. Alternatively, in addition to a network protocol for a functional module 110, the controller 130 may configure a function implemented by the functional module, for example, configure a specific algorithm or a sub-module for the functional module.

The switching module 120 is configured to send a first data packet to a first functional module of the at least one functional module according to the flow table configured by the controller 130. The first functional module is a functional module first indicated in the flow table to process the data packet.

The switching module 120 may support an existing switching mode, or may support an OpenFlow-based software programmable flow table routing and switching mechanism. Similar to a flow table (flow table) for a conventional network, the flow table herein includes two parts: a filter (filter) and an action (action). The filter is used to obtain a specific type of data packet/data stream by means of filtering. The action is used to indicate a corresponding operation, and includes an order in which the data packet/data stream is processed in subsequent functional modules.

The at least one functional module 110 is configured to process the first data packet according to the protocol function configured by the controller 130.

In the access network system in this embodiment of the present invention, a controller is configured to perform configuration a protocol function for a functional module and a flow table for a switching module, the switching module sends a data packet to a corresponding functional module according to the flow table, and then the functional module processes the data packet according to the configured protocol function. In this way, an appropriate procedure can be selected for processing the data packet, processing efficiency is improved, and software definition at a protocol stack layer is implemented.

Figure 2:
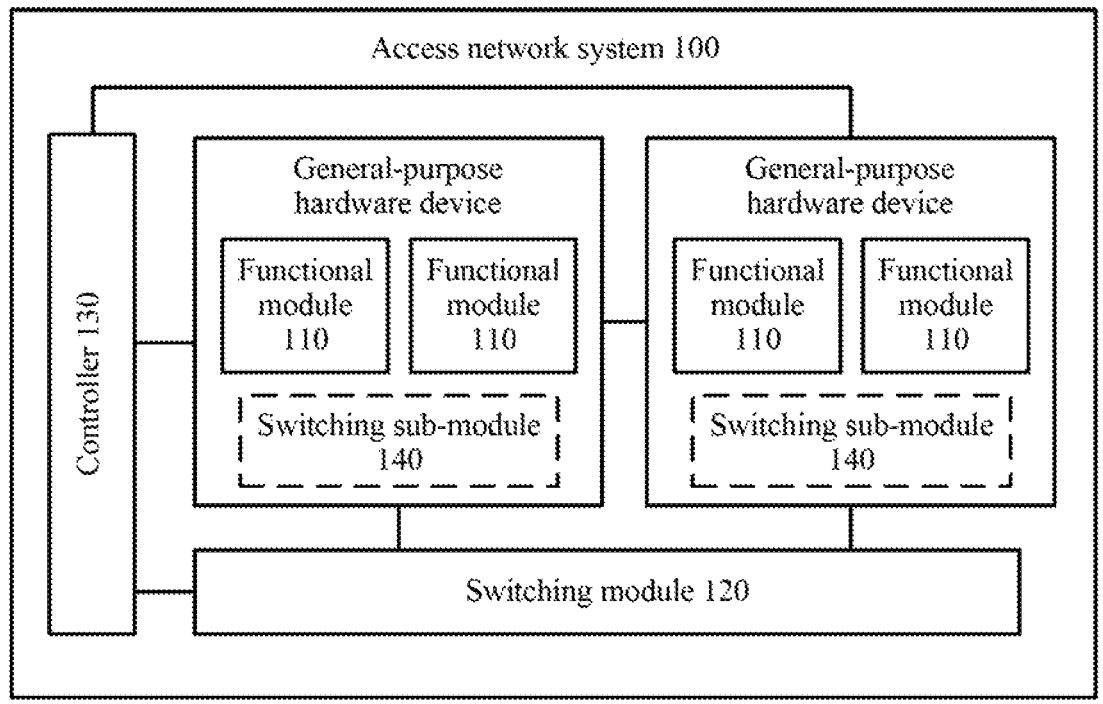
FIG. 2 is a schematic block diagram of an access network system according to another embodiment of the present invention.

Optionally, in another embodiment, as shown in FIG. 2, at least one functional module 110 may operate in one or more general-purpose hardware devices. Correspondingly, a first functional module may operate in a first general-purpose hardware device of the one or more general-purpose hardware devices.

Specifically, the at least one functional module 110 may be deployed, in a form of a module or a virtual machine, in a centrally managed general-purpose hardware device. One or more functional modules 110 may operate in one general-purpose hardware device. A same quantity or different quantities of functional modules may operate in the general-purpose hardware devices.

In addition, a switching module 120 and a controller 130 may also be deployed, in a form of a module or a virtual machine, in general-purpose hardware devices. Each module or virtual machine supports a customizable data switching capability. Therefore, costs of hardware deployment and upgrade and software maintenance in the access network system can be reduced.

When the functional module 110, the switching module 120, and the controller in the access network system are deployed on a centrally managed general-purpose hardware device platform, costs of hardware deployment and upgrade and software maintenance in the access network system can be reduced.

It should be understood that, in consideration of performance, alternatively, the switching module 120 may not operate in a virtual machine, but includes multiple physical machines. This is not limited in this embodiment of the present invention.

In actual deployment, one access network system may include multiple general-purpose hardware devices. Various combinations of different functional modules may be deployed statically or dynamically in and managed by these general-purpose hardware devices according to an actual requirement, to form a required network element function, such as a base station, a gateway, a router, or another network element.

Optionally, as shown in FIG. 2, the first general-purpose hardware device may further include: a switching sub-module 140, configured to forward a data packet between functional modules operating on the first general-purpose hardware device.

It should be understood that, as shown in FIG. 2, when functional modules in the access network system 100 operate on multiple general-purpose hardware devices, each general-purpose hardware device may include a switching sub-module 140. In this case, the switching sub-module 140 may be further configured to forward a data packet between the general-purpose hardware devices.

In this embodiment of the present invention, the switching module 120 may be configured to forward a data packet between the outside (such as a network side) and the general-purpose hardware devices in the access network system, and the switching sub-module 140 may be configured to forward a data packet between functional modules in a general-purpose hardware device and between general-purpose hardware devices.

In the access network system in this embodiment of the present invention, a data switching function is added to a general-purpose hardware device and a two-layer data switching module is arranged in the access network system, so that different data switching requirements in the access network system can be met and flexibility of the access network system is further improved.

It should be noted that when a general-purpose hardware device does not have a switching capability, the functional module 110 needs to bind with a specific virtual port on general-purpose hardware devices to forward a data packet.

Optionally, in another embodiment, the switching module 120 may be specifically configured to: receive a second data packet; replace a packet header of the second data packet with a software-defined protocol (Software Defined Protocol, SDP) packet header according to content that is in the flow table and that is corresponding to the packet header of the second data packet, to generate the first data packet, where the SDP packet header includes indication information of the at least one functional module and a protocol header corresponding to a functional module indicated by the indication information; and send the first data packet to the first functional module. The first functional module 110 is specifically configured to: process, according to a protocol function configured by the controller 130, a protocol header that is in the SDP packet header and corresponding to the first functional module.

Optionally, in another embodiment, the first functional module is further configured to: send the first data packet processed by the first functional module to a second functional module, where the second functional module is a functional module that follows the first functional module and that is indicated by the indication information, and the second functional module is another functional module in the at least one functional module; or send the first data packet processed by the first functional module to the switching module, so that the switching module performs next-hop forwarding.

For example, when the indication information includes only one functional module, the first functional module is a module finally indicated by the indication information. In this case, after processing a corresponding protocol header according to a configured protocol function, the first functional module sends the processed data packet to the switching module, and the switching module performs next-hop forwarding.

Because the access network system in this embodiment of the present invention can implement software definition at a protocol stack layer, the access network system in this embodiment of the present invention may also be referred to as an SDP access network system.

Specifically, in another embodiment, the controller 130 is specifically configured to perform configuration the flow table for the switching module 120 and the protocol function for the at least one functional module 110 according to a control policy.

Optionally, in another embodiment, the access network system 100 may further include: a centralized controller 150, configured to generate the control policy, and configure the control policy onto the controller 130.

The centralized controller 150 may generate the control policy according to a service requirement.

In this embodiment of the present invention, the centralized controller 150 generates the control policy according to a service requirement, and the controller 130 is responsible for executing the control policy from the centralized controller 150, so that load balance between functional modules can be adjusted, and load balance between general-purpose hardware devices on which functional modules are located can be adjusted.

The control policy may include a data packet processing mode and a data packet processing procedure. The data packet processing mode may refer to a general-purpose hardware device and a functional module in the general-purpose hardware device that are used to process a data packet. The data packet processing procedure may refer to an order in which a data packet passes through general-purpose hardware devices and functional modules in the general-purpose hardware devices.

The controller 130 may be specifically configured to perform configuration the protocol function for the at least one functional module according to the data packet processing mode, and configure the flow table for the switching module according to the data packet processing mode and the data packet processing procedure.

In the access network system in this embodiment of the present invention, various protocol stack functions that are originally always implemented on a specific network element are deployed, in a form of a module or virtual machine, on a general-purpose hardware platform, inter-device function selection and data packet routing can be performed by using a control policy, and a further operation may be performed on a function algorithm in a functional module. In this way, software definition at a protocol stack layer is implemented. Therefore, the access network system in the present invention may also be referred to as an SDP access cloud.

In addition, the centralized controller 150 may also be connected to multiple access network systems 100 shown in FIG. 1 and FIG. 2. It can be understood that the multiple access network systems 100 shown in FIG. 1 and FIG. 2 may also form a larger access network system centrally managed by the centralized controller 150, as shown in FIG. 3.

In this embodiment of the present invention, multiple access network systems are centrally managed by a centralized controller, so that load balance between access network systems, between functional modules in each access network system, and between functional sub-modules in each functional module can be implemented.

In addition, in this embodiment of the present invention, because the centralized controller can generate a control policy according to a service requirement, access network systems that are deployed in a centralized manner can provide a good resource sharing environment and can effectively improve resource utilization. For example, for a tidal effect of wireless network traffic, the access network system in this embodiment of the present invention can adaptively adjust a service processing procedure to improve resource utilization.

In the access network system in this embodiment of the present invention, a centralized controller performs centralized management, so that load balance between multiple access network systems, between general-purpose hardware devices in each access network system, and between functional modules in each general-purpose hardware device can be implemented.

In addition, the access network systems 100 can be understood as devices deployed in a centralized manner, and have SDN-based software-defined data routing and switching capabilities. An access point is a distributed site. For example, the access point may be a remote radio unit (Remote Radio Unit, RRU), a base station with a function of a physical layer only, a base station with a function of a physical layer and another layer, a small-sized base station with complete functions, or a heterogeneous access site (such as a Wi-Fi AP).

There may be multiple solutions for routing between an access network system and an access point in this embodiment of the present invention. For example, an access network system may be deployed at a node in a network, and a data packet from a distributed access point may be routed to the access network system according to a specified route. Alternatively, an SDN network may be deployed between an access point and an access network system, and a data packet from the access point is routed to the access network system according to a configured forwarding path. Alternatively, a data packet from an access point may be routed to an access network system by using a tunnel network (such as MPLS) technology. Alternatively, an access point and an access network system may be directly connected, and a data packet from the access point may be directly routed to the access network system.

In the access network system in this embodiment of the present invention, a controller is configured to perform configuration a protocol function for a functional module and a flow table for a switching module, the switching module sends a data packet to a corresponding functional module according to the flow table, and then the functional module processes the data packet according to the configured protocol function. In this way, an appropriate procedure can be selected for processing the data packet, processing efficiency is high, and software definition at a protocol stack layer is implemented.

FIG. 4 is a schematic flowchart of a data packet processing method 400 according to an embodiment of the present invention. The method 400 may be executed by the switching module 120 in the access network system 100 shown in FIG. 1 to FIG. 3. As shown in FIG. 4, the method 400 may include the following content.

410. Receive a second data packet.

For example, the switching module may receive the second data packet from a network side.

420. Replace a packet header of the second data packet with a software-defined protocol SDP packet header according to content that is in a configured flow table and that is corresponding to the packet header of the second data packet, to generate a first data packet, where the SDP packet header includes indication information of at least one functional module that processes the first data packet, and a protocol header corresponding to a functional module indicated by the indication information.

The packet header of the second data packet may be an IP packet header, an Ethernet packet header, or a network transport protocol packet header in another format.

430. Send the first data packet to a functional module first indicated by the indication information, so that the first functional module processes a corresponding protocol header in the SDP packet header according to a configured protocol function.

In the data packet processing method in this embodiment of the present invention, a packet header of a data packet received from a network side is used to match a flow table, the packet header of the data packet is replaced with an SDP packet header according to corresponding content in the flow table, and then the data packet is sent to a corresponding functional module. In this way, an appropriate procedure can be provided for processing a data service, processing efficiency is improved, and software definition at a protocol stack layer is implemented.

Figure 5:
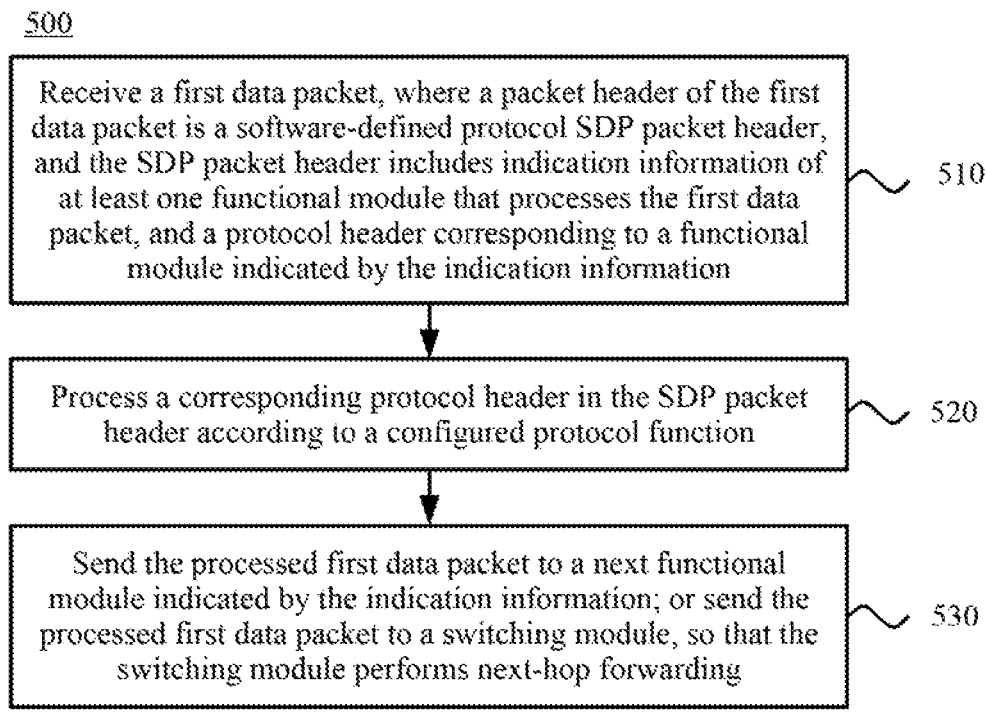
FIG. 5 is a schematic flowchart of a data packet processing method according to another embodiment of the present invention.

FIG. 5 is a schematic flowchart of a data packet processing method 500 according to an embodiment of the present invention. The method 500 may be executed by the functional module 110 in the access network system 100 shown in FIG. 1 to FIG. 3. As shown in FIG. 5, the method 500 may include the following content.

510. Receive a first data packet, where a packet header of the first data packet is a software-defined protocol SDP packet header, and the SDP packet header includes indication information of a functional module that processes the first data packet, and a protocol header corresponding to a functional module indicated by the indication information.

520. Process a corresponding protocol header in the SDP packet header according to a configured protocol function.

530. Send the processed first data packet to a next functional module indicated by the indication information; or send the processed first data packet to a switching module, so that the switching module performs next-hop forwarding.

In other words, when the functional module is a functional module finally indicated by the indication information in the SDP packet header, the processed first data packet is sent to the switching module, and the switching module performs next-hop forwarding. When the functional module is not a functional module finally indicated by the indication information in the SDP packet header, the processed first data packet is sent to a next functional module indicated by the indication information.

In the data packet processing method in this embodiment of the present invention, a protocol header corresponding to an SDP packet header is processed according to a configured protocol function. In this way, an appropriate procedure can be provided for processing a data service, processing efficiency is improved, and software definition at a protocol stack layer is implemented.

With reference to FIG. 6, the following describes in detail the data packet processing methods 400 and 500 in the embodiments of the present invention. FIG. 6 is another schematic block diagram of an access network system 100 according to an embodiment of the present invention. As shown in FIG. 6, when a functional module operates on a general-purpose hardware device, a controller configures the functional module by using a control module of the general-purpose hardware device. A dotted curve shown in FIG. 6 is a data packet processing procedure in a cloud access network system. A data packet enters a switching module. The switching module replaces a packet header of the data packet with an SDP packet header according to an indication in a flow table and sends the data packet to a corresponding functional module for processing. Then the switching module forwards the data packet out. A specific example is used for description as follows.

It is assumed that a switching module in an access network system receives an Ethernet data packet from a network side. The switching module strips an Ethernet packet header from the Ethernet data packet to obtain a payload (Payload), and matches the Ethernet packet header against a locally stored flow table list to find a corresponding flow table. In the flow table, an action corresponding to the Ethernet packet header is that functional modules a, b, and c are responsible for processing the data packet at a protocol A layer, at a protocol B layer, and at a protocol C layer respectively. Then, the switching module adds an SDP packet header for the payload to obtain an SDP data packet. A format of the SDP data packet is shown in FIG. 7. The SDP packet header is located in the beginning. The a/b/c in the SDP packet header indicates that the data packet is to be processed by functional modules a, b, and c. The protocol header A, the protocol header B, and the protocol header C indicate that the functional modules a, b, and c process the protocol header A, the protocol header B, and the protocol header C of the SDP data packet respectively.

Specifically, the switching module forwards the SDP data packet to the functional module a to process the protocol header A of the SDP data packet. The functional module a forwards the processed SDP data packet to the functional module b. After processing the protocol header B of the SDP data packet, the functional module b forwards the processed SDP data packet to the functional module c. When the functional module c is a functional module finally indicated by the indication information in the SDP packet header, after processing the protocol header C, the functional module c sends the processed SDP data packet to the switching module, so that the switching module performs next-hop data packet forwarding.

FIG. 8 is a data packet processing apparatus 800 according to an embodiment of the present invention. As shown in FIG. 8, the apparatus 800 may include: a receiving unit 810, a processing unit 820, and a sending unit 830.

The receiving unit 810 is configured to receive a second data packet.

The processing unit 820 is configured to replace a packet header of the second data packet with a software-defined protocol SDP packet header according to content that is in a configured flow table and that is corresponding to the packet header of the second data packet, to generate a first data packet. The SDP packet header includes indication information of at least one functional module that processes the first data packet, and a protocol header corresponding to a functional module indicated by the indication information.

The sending unit 830 is configured to send the first data packet to a functional module first indicated by the indication information, so that the first functional module processes a corresponding protocol header in the SDP packet header according to a configured protocol function.

According to the data packet processing apparatus in this embodiment of the present invention, a packet header of a data packet received from a network side is used to match a flow table, the packet header of the data packet is replaced with an SDP packet header according to corresponding content in the flow table, and then the data packet is sent to a corresponding functional module. In this way, an appropriate procedure can be provided for processing a data service, processing efficiency is improved, and software definition at a protocol stack layer is implemented.

It should be understood that the data processing apparatus 800 according to this embodiment of the present invention may be corresponding to the switching module in the access network system 100 according to the embodiments of the present invention and the switching module in the data processing method 400 according to the embodiments of the present invention. In addition, the foregoing and other operations and/or functions of all the modules in the apparatus 800 are respectively used for implementing corresponding procedures in the method 400, and for brevity, details are not described herein again.

Figure 9:
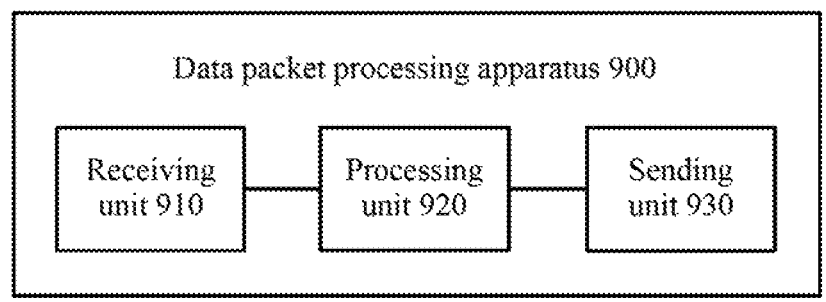
FIG. 9 is a schematic block diagram of a data packet processing apparatus according to another embodiment of the present invention.

FIG. 9 is a data packet processing apparatus 900 according to another embodiment of the present invention. As shown in FIG. 9, the apparatus 900 may include: a receiving unit 910, a processing unit 920, and a sending unit 930.

The receiving unit 910 is configured to receive a first data packet. A packet header of the first data packet is a software-defined protocol SDP packet header, and the SDP packet header includes indication information of at least one functional module that processes the first data packet, and a protocol header corresponding to a functional module indicated by the indication information.

The processing unit 920 is configured to process a corresponding protocol header in the SDP packet header according to a configured protocol function.

The sending unit 930 is configured to send the processed first data packet to a next functional module indicated by the indication information; or send the processed first data packet to a switching module, so that the switching module performs next-hop forwarding.

According to the data packet processing apparatus in this embodiment of the present invention, a protocol header corresponding to an SDP packet header is processed according to a configured protocol function. In this way, an appropriate procedure can be provided for processing a data service, processing efficiency is improved, and software definition at a protocol stack layer is implemented.

It should be understood that the data processing apparatus 900 according to this embodiment of the present invention may be corresponding to the functional module in the access network system 100 according to the embodiments of the present invention and the functional module in the data processing method 500 according to the embodiments of the present invention. In addition, the foregoing and other operations and/or functions of all the modules in the apparatus 900 are respectively used for implementing corresponding procedures in the method 500, and for brevity, details are not described herein again.

Figure 10:
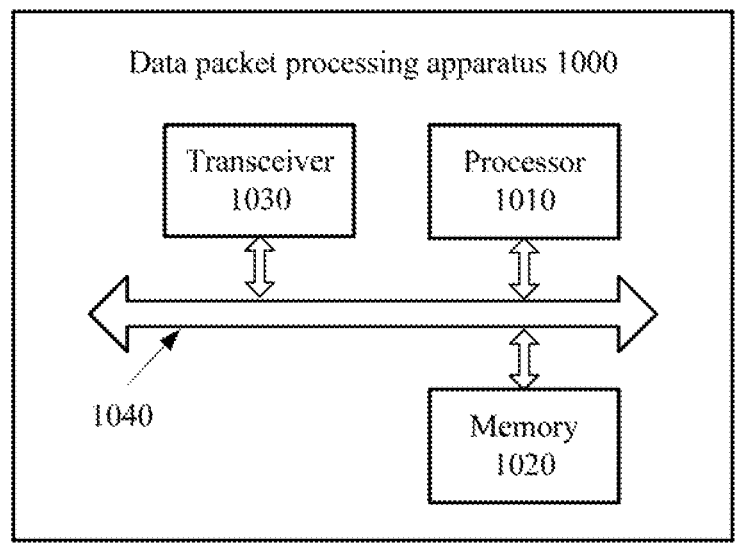
FIG. 10 is a schematic block diagram of a data packet processing apparatus according to another embodiment of the present invention.

FIG. 10 is a data packet processing apparatus 1000 according to another embodiment of the present invention. As shown in FIG. 10, the apparatus 1000 may include: a processor 1010, a memory 1020, and a transceiver 1030. The processor 1010 controls an operation of the apparatus 1000. The processor 1010 may also be referred to as a CPU (Central Processing Unit, central processing unit). The memory 1020 may include a read-only memory and a random access memory, and provide an instruction and data for the processor 1010. A part of the memory 1020 may further include a non-volatile random access memory (NVRAM). The processor 1010, the memory 1020, and the transceiver 1030 are coupled together by using a bus system 1040. The bus system 1040 includes a power bus, a control bus, and a status signal bus in addition to a data bus. However, for clear description, all types of buses are marked as the bus system 1040 in the figure.

The transceiver 1030 is configured to receive a second data packet.

The processor 1010 is configured to replace a packet header of the second data packet with a software-defined protocol SDP packet header according to content that is in a configured flow table and that is corresponding to the packet header of the second data packet, to generate a first data packet. The SDP packet header includes indication information of at least one functional module that processes the first data packet, and a protocol header corresponding to a functional module indicated by the indication information.

The transceiver 1030 is further configured to send the first data packet to a functional module first indicated by the indication information, so that the first functional module processes a corresponding protocol header in the SDP packet header according to a configured protocol function.

According to the data packet processing apparatus in this embodiment of the present invention, a packet header of a data packet received from a network side is used to match a flow table, the packet header of the data packet is replaced with an SDP packet header according to corresponding content in the flow table, and then the data packet is sent to a corresponding functional module. In this way, an appropriate procedure can be provided for processing a data service, processing efficiency is improved, and software definition at a protocol stack layer is implemented.

It should be understood that the data processing apparatus 1000 according to this embodiment of the present invention may be corresponding to the switching module in the access network system 100 according to the embodiments of the present invention, the switching module in the data processing method 400 according to the embodiments of the present invention, and the apparatus 800 according to the embodiments of the present invention. In addition, the foregoing and other operations and/or functions of all the modules in the apparatus 1000 are respectively used for implementing corresponding procedures in the method 400, and for brevity, details are not described herein again.

Figure 11:
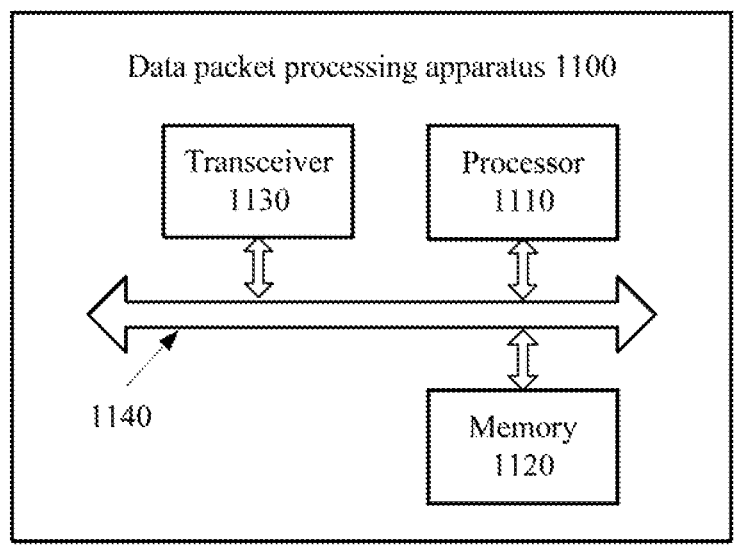
FIG. 11 is a schematic block diagram of a data packet processing apparatus according to another embodiment of the present invention.

FIG. 11 is a data packet processing apparatus 1100 according to another embodiment of the present invention. As shown in FIG. 11, the apparatus 1100 may include: a processor 1110, a memory 1120, and a transceiver 1130. The processor 1110 controls an operation of the apparatus 1000. The processor 1110 may also be referred to as a CPU (Central Processing Unit, central processing unit). The memory 1120 may include a read-only memory and a random access memory, and provide an instruction and data for the processor 1110. A part of the memory 1120 may further include a non-volatile random access memory (NVRAM). The processor 1110, the memory 1120, and the transceiver 1130 are coupled together by using a bus system 1140. The bus system 1140 includes a power bus, a control bus, and a status signal bus in addition to a data bus. However, for clear description, all types of buses are marked as the bus system 1140 in the figure.

The transceiver 1130 is configured to receive a first data packet. A packet header of the first data packet is a software-defined protocol SDP packet header, and the SDP packet header includes indication information of at least one functional module that processes the first data packet, and a protocol header corresponding to a functional module indicated by the indication information.

The processor 1110 is configured to process, according to a configured protocol function, a protocol header that is corresponding to a functional module and in the SDP packet header.

The transceiver 1130 is further configured to send the processed first data packet to a next functional module indicated by the indication information; or send the processed first data packet to a switching module, so that the switching module performs next-hop forwarding.

According to the data packet processing apparatus in this embodiment of the present invention, a protocol header corresponding to an SDP packet header is processed according to a configured protocol function. In this way, an appropriate procedure can be provided for processing a data service, processing efficiency is improved, and software definition at a protocol stack layer is implemented.

It should be understood that the data processing apparatus 1100 according to this embodiment of the present invention may be corresponding to the functional module in the access network system 100 according to the embodiments of the present invention, the functional module in the data processing method 500 according to the embodiments of the present invention, and the apparatus 900 according to the embodiments of the present invention. In addition, the foregoing and other operations and/or functions of all the modules in the apparatus 1100 are respectively used for implementing corresponding procedures in the method 500, and for brevity, details are not described herein again.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. An access network system, comprising hardware components including:
   a controller configured to:
      configure a flow table to a switching module;
      configure a first protocol function to a first functional module of a plurality of functional modules;
   the switching module configured to:
      receive a first data packet;
      determine, based on the flow table, the plurality of functional modules;
      add a software-defined protocol (SDP) packet header to the first data packet indicating the first functional module of the plurality of functional modules and a second functional module of the plurality of functional modules, wherein the first functional module and the second functional module perform different protocol functions;
      send the first data packet to a first functional module according to the flow table, wherein the first functional module is a functional module indicated first in the flow table; and
   the first functional module configured to:
      process the first data packet according to the first protocol function to generate a processed first data packet; and
      transmit, based in part on the SDP packet header, the processed first data packet to the second functional module, wherein the second functional module is a functional module indicated second in the flow table.

2. The access network system according to claim 1, wherein the switching module is further configured to:
   replace a packet header of the first data packet with the SDP packet header according to content in the flow table, wherein the SDP packet header comprises:
      indication information of the first functional module; and
      a first protocol header corresponding to the first functional module indicated by the indication information; and
   the first functional module is further configured to:
      process, according to the first protocol function, the first protocol header that is in the SDP packet header.

3. The access network system according to claim 2, wherein the second functional module is configured to:
   process the processed first data packet according to a second protocol function, wherein the second functional module is a functional module that sequentially follows the first functional module as indicated by the indication information.

4. The access network system according to claim 3, wherein the controller is specifically configured to:
    configure the flow table for the switching module according to a control policy.

5. The access network system according to claim 2, wherein the controller is further configured to:
    configure the flow table for the switching module and the first protocol function according to a control policy.

6. The access network system according to claim 1, wherein the controller is further configured to:
    configure, based on a control policy, the flow table; and
    configure, based on the control policy, the first protocol function.

7. The access network system according to claim 6, further comprising:
    a centralized controller configured to generate the control policy.

8. The access network system according to claim 7, wherein the control policy comprises a data packet processing mode and a data packet processing procedure; and
    the controller is further configured to:
        configure the first protocol function according to the data packet processing mode; and
        configure the flow table according to the data packet processing mode and the data packet processing procedure.

9. The access network system according to claim 6, wherein the control policy comprises a data packet processing mode and a data packet processing procedure; and
    the controller is further configured to:
        configure the first protocol function according to the data packet processing mode; and
        configure the flow table according to the data packet processing mode and the data packet processing procedure.

* * * * *